Jan. 17, 1933.                    E. E. FOWLER                    1,894,350
                    COMBINED TYPEWRITING AND COMPUTING MACHINE
                    Filed March 25, 1926        3 Sheets-Sheet 1
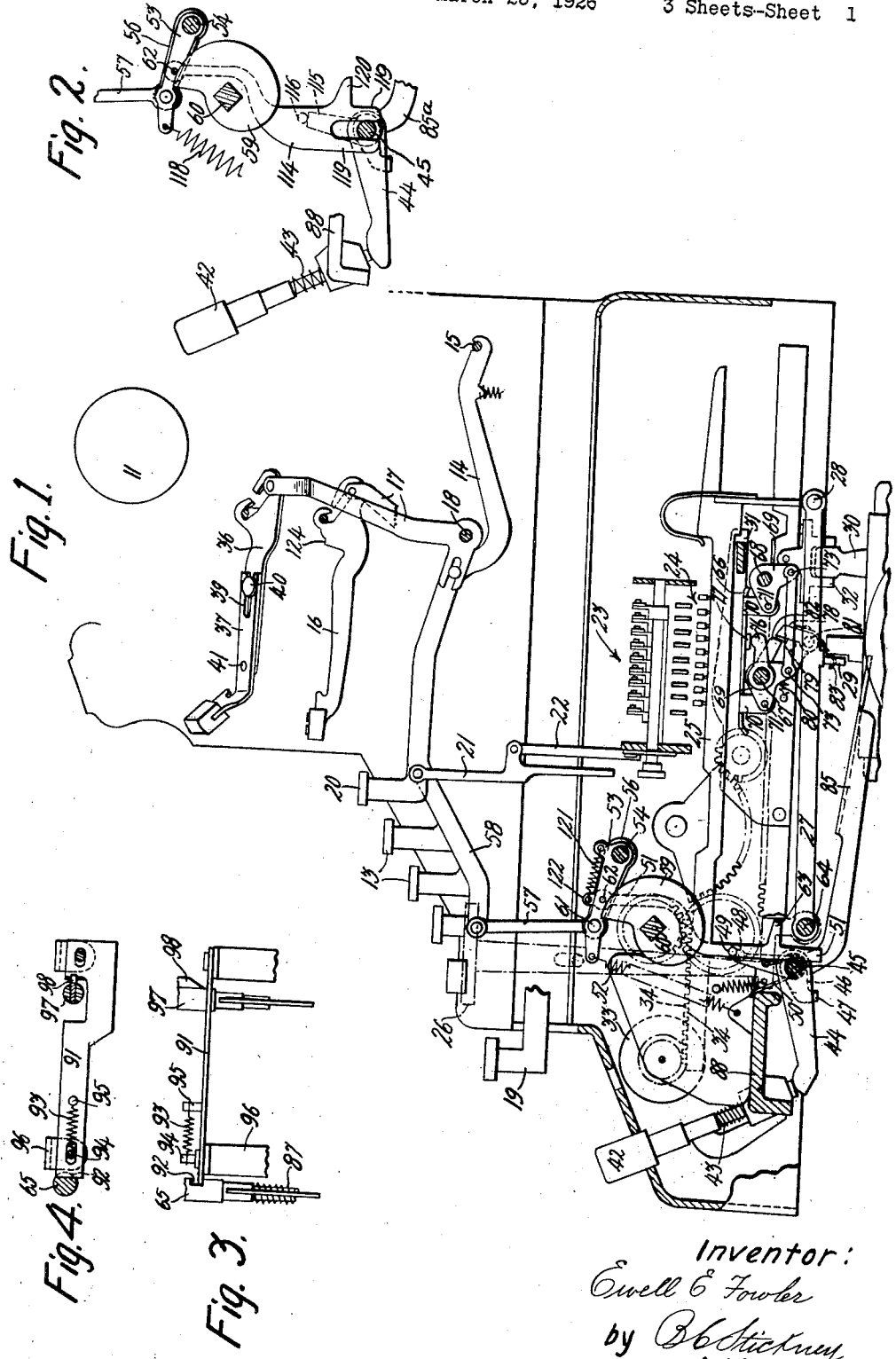
Inventor:
Ewell E Fowler
by D C Stickney
Attorney Jan. 17, 1933.  E. E. FOWLER  1,894,350
COMBINED TYPEWRITING AND COMPUTING MACHINE
Filed March 25, 1926  3 Sheets-Sheet 2
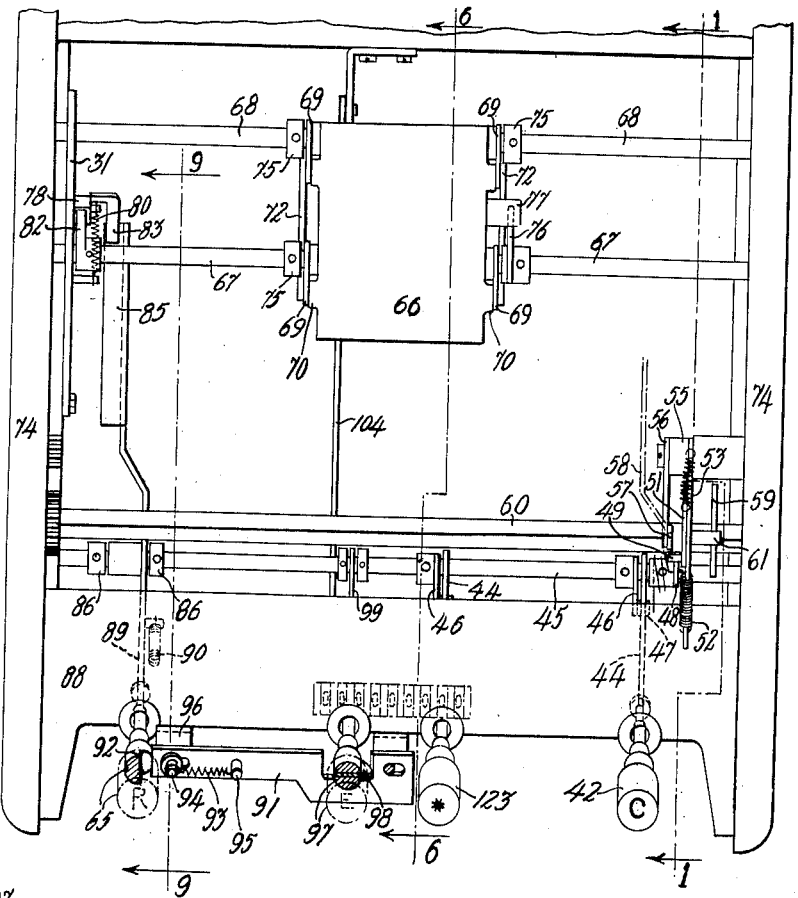
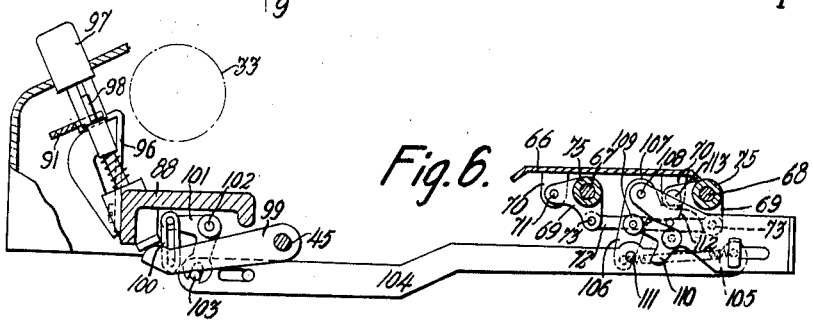
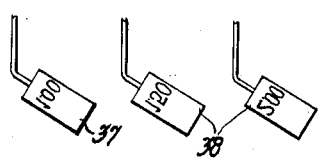
Fig. 7.
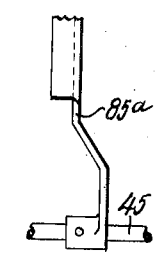
Fig. 8.
Inventor:
Ewell E Fowler
by B.E.Stickney
Attorney Patented Jan. 17, 1933

1,894,350

UNITED STATES PATENT OFFICE

EWELL E. FOWLER, OF EAST POINT, GEORGIA, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed March 25, 1926. Serial No. 97,206.

This invention relates to means for typing a series of attached checks of the same denomination in typewriting and computing machines, and is especially applicable to machines of the Underwood-Hanson type.

When the work to be performed in such class of machines calls for the typing of a series of checks for the same amounts, it has been found that, owing to the monotony of the work, the operator is liable to make errors, and inasmuch as all the errors are recorded or entered into the register, their corrections are slow and disagreeable.

According to certain features of this invention, whose object is to preclude the errors, the checks to be typed are supplied in the form of a continuous strip, having weakened lines separating the forms to facilitate the detaching of each typed form. The checks are inserted around the platen, and the first check is positioned at the printing line, so that the name of the party and the amount of the check may be typed in numerals in the regular manner. When typing the amount the pins of corresponding denomination are set in the pin-bars in the regular way, and then the machine is cycled to accumulate the typed amounts in the register. However, before cycling the machine it is necessary to set mechanism to prevent restoring of the pins, but this will be dealt with later.

Usually only one line is typed on each check, all the other data being either previously printed or rubber-stamped thereon. In order to position the next check at the printing line, it is desirable to provide a platen-sweep, which can be adjusted to rotate the platen an amount equal to the distance between the lines of typing on the first and second checks. The name on the second check is then typed, but in order to quickly and correctly type the same amount on the second check, there is provided mechanism which is operated by means of a special cycle key.

Since each series of checks is for the same amount, and the amount may vary in another series of checks, there is provided a special type-bar having a detachable type-head, which type-head may be replaced by other type-heads of different denominations. However, owing to the fact that the special type-bar carries three or four types and is much heavier, its depression would be hard if manually operated, and it is for this reason that the special type-bar is operatively connected to a power-driven mechanism in a manner to be hereinafter described.

Upon depressing the cycle key, there is provided mechanism which releases the special type-bar to the recoil of a spring operative to swing the type-bar, but since, in order to accomplish the full objects of this invention, it is necessary not only to swing the type-bar but to accumulate in the register an amount equal to the amount typed on the check, there is provided mechanism to automatically eliminate the normal action of the general operator, which actuates on the pin-restoring platform. The cycle key must also be effective to start the motor, thereby cycling the machine, and since the pins are not restored upon operation of the general operator, the same amount which was entered on the first check will be accumulated in the register for the amount of the second check.

According to one form of the invention, the mechanism is not all set by the cycle key, but another key is provided which may be called a repeat key, and which key must be depressed and locked prior to depressing the cycle key.

After typing a series of checks of the same denomination, and in order to write checks of different amounts, the special type-head is changed to the proper denomination, and then an eliminator key is depressed to automatically restore all the pins in the pin-bars. The new amount is then set on the pin-bars by typing the new amount on the first check of the new series in the regular way, and after this first typing operation, the cycle key is operated to print all the other checks with the same amount.

In order to force the operator to clear the first setting in the pin-bars, when changing to checks to other denominations, there is provided a special eliminator key in one form of the invention, which key is manually operated to restore the pins in the pin-bars. Said eliminator key is effective to release a locking bar which holds the repeat key in its depressed or operative position. By means of this mechanism, it will be seen that the operator not only restores the pins in the pin-bars when depressing the eliminator key, but also clears the repeat key, thereby restoring the machine for regular operation.

It will be understood that, according to one form of the invention, it is necessary to cycle the motor by operating the cycle key after the typing of the amount on the first check; but since the cycle key is effective to operate the special type-bar and the amount has already been typed on the first check, it is necessary to first operate a non-print key which, although not shown in this invention, forms a part of the standard equipment of the Underwood-Hanson machines. Said non-print key is effective to prevent the double typing which would ensue if the cycle key were permitted to operate in the regular way.

Other features and advantages will hereinafter appear.

In the accompanying drawings,

Figure 1 is a sectional view, in elevation, from front to rear, of an Underwood-Hanson combined typewriting and computing machine, having the present invention applied thereto, the view being taken on the plane of 1—1, Figure 5.

Figure 2 shows a modified form of the invention.

Figure 3 is a detached view of a lock, which prevents the depression of the eliminator key under certain conditions.

Figure 4 is a plan view of Figure 3.

Figure 5 is a plan view of some of the computing mechanism, with the typewriting machine removed.

Figure 6 is a sectional view on the line 6—6 of Figure 5, looking in the direction of the arrows.

Figure 7 shows the type-faces of some of the removable type-heads.

Figure 8 is a detail view of the non-pin-restoring mechanism employed with the modification of Figure 2.

Figures 9, 10:
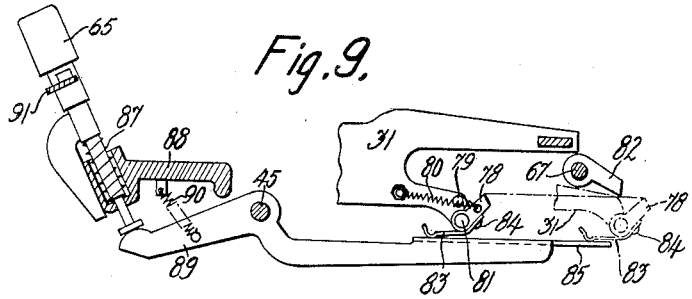
Figure 9 is a sectional view on the line 9—9 of Figure 5.
Figure 10 is a face view of the check-forms intended to be used in connection with this invention.

According to the method of handling the work in this invention, a series of checks, such as illustrated in Figure 10, upon which it is desired to type the name of the party and the amount of the check, is inserted around a platen 11, and is positioned for a first line of typing 12 upon the first check. The name is typed by means of depressible keys 13, which operate key-levers 14 fulcrumed at 15, the key-levers being operatively connected to type-bars 16 by means of bell-cranks 17 fulcrumed at 18. The carriage is then tabulated, by means of a key 19, to a position for typing the amount upon the first check, which in this case is $1.00. This amount is then typed by means of numeral-keys 20, which operate corresponding type-bars operatively connected, by means of links 21 and 22, to a pin-setting frame 23, which is effective to actuate upon corresponding pins 24 of a pin-bar 25, which has been brought to setting position by means, not shown, operated by the carriage. After typing the amount, a motor-starting key 26 is depressed to render a motor-starting bar 27, fulcrumed upon a fixed pivot 28, effective to swing a lever 29, thereby permitting the operating lug 30 to actuate and carry therewith a general operator 31, to which it is connected by means of a yoke 32, details of which may be seen in the patent to A. G. Kupetz, dated April 17, 1923, No. 1,452,162. The general operator carries forward all the pin-bars upon which pins have been set by the keys 20, thereby accumulating in wheels 33, by means of racks 34, amounts equal to the denominations typed. However, prior to depressing the motor-starting key, it is necessary to set means for preventing the operation of a pin-restoring mechanism, but this mechanism will be hereinafter described.

The checks are then positioned for a line of typing 35 on the second check, and, in order to render the operation more expeditious, the platen is usually provided with a platen-sweep, not shown, but may be similar to that shown in the Patent to Roberts, dated January 8, 1918, No. 1,252,846. As it is one of the principal objects of this invention to facilitate the typing of the repeated amounts on all the checks except the first one, there is provided a special type-bar 36 which has a detachable type-head 37, which may be easily replaced by other type-heads 38 of different denominations, such as shown in Figure 7. The type-heads 37 and 38 are made of spring-material, and are provided with slots 39, which are engaged by the head of a stud 40 fast to the type-bar 36. In order to remove the type-head from the bar 36, it is only necessary to disengage a pin 41 from a hole, not shown, in the bar 36, and then to pull the type-head outwardly to free it from the pin 41.

In order to swing the special type-bar 36 mechanically, that is to say, by means actuated by the motor, there is provided a special cycle key 42 which is manually depressed against the tension of a spring 43, and which actuates a lever 44 loose on a shaft 45 and effective to rock the shaft 45 by means of an arm 46 secured to the shaft and having a tab 47 which is engaged by the under side of the lever 44. The shaft 45 carries a pawl 48, which is normally held in engagement with a pin 49 on a link 51, by means of a spring 50. It will be seen, upon referring to Figure 1, that, upon depression of the key 42, the pawl 48 will be swung out from under the pin 49, thereby permitting the link 51 to move downwardly under the tension of a spring 52 to actuate an arm 53, rockably mounted upon a fixed stud 54, and connected by means of a hub 55 to an arm 56, the latter being operatively connected by means of a link 57 to a special key-lever 58, which, by means of the usual connections, operates the special type-bar 36. The link 51 may be provided with a spring 121 between the upper end of said link at 122 and the arm 53, to hold the link in its normal position against the shaft 43, in a manner shown by R. F. Hoyt, February 12, 1918, No. 1,256,309.

Since the key 42 is effective to only release the printing mechanism, to the tension of the spring 52, it will be seen that means must be provided for automatically resetting the mechanism. Said means may comprise a cam 59 mounted on a shaft 60, which, for reasons well known in the art, rotates only during the return-stroke of the general operator, and is effective, to cam a pin 61 carried by the arm 53 to which the link 51 is pivotally mounted at 62. In order that the motor may be tripped automatically upon the depression of the cycle key 42, the link 51 is provided with a finger 63 which engages with a stud 64 fast to the motor-starting bar 27. It should be understood, however, that if the motor were to operate to cycle the machine in the regular way, the indexed pins would be automatically restored, thereby defeating the purpose of this invention. To prevent the restoring of the key-indexed pins when the motor is cycled, a special repeat key 65 has been provided. However, since the repeat key operates to prevent the operation of a pin-restoring platform 66, it is deemed necessary to first describe the normal operation of the mechanism, which restores the pins when the machine is cycled.

The pin-restoring platform 66 is operatively mounted upon shafts 67 and 68 by means of four bell-cranks 69, rockably mounted on said shafts. The platform 66 is provided with four ears 70 one at each corner and connected to a bell-crank 69 by means of pivot-pin 71. The bell-cranks 69 include downwardly-extending arms connected in pairs by links 72, by means of pins 73, the links being effective to impart to the platform 66 an up-and-down parallel motion when the bell-cranks 69 are operated. Both shafts 67 and 68 are journaled in end frames 74, and the bell-cranks 69 are positioned upon the shafts by means of collars 75. In order to elevate the platform, to restore the indexed pins 24, the shaft 67 has fast thereto an arm 76, to engage an ear 77 fast to the platform. Since it is desired to raise the platform at the end of the return-stroke of the general operator, in order to restore the indexed pins after each computation, there is provided a trip-pawl 78, normally held against a pin 79 by means of a spring 80. Said pawl is mounted on a stud 81, carried by the general operator, and, owing to its resiliency, it trips idly under an arm 82 fast to the shaft 67 during the forward stroke of the general operator, but cams said arm on its return-stroke, thereby elevating the platform and restoring the indexed pins 24, in the well-known Underwood manner.

In order to prevent the restoring of the indexed pins when the general operator cycles, the pawl 78 may be held out of tripping engagement with the arm 82 during the return-stroke of the general operator, as by providing a flat resilient finger 83 secured to the pawl by means of a rivet 84 and designed to bear upon the bent-over section 85 of a lever 89 held in position upon the shaft 45 by means of collars 86. In Figure 9, the pawl 78 is shown in its released position at both ends of the travel of the general operator with the repeat key depressed against the action of a spring 87, housed within a frame 88, and against the tension of the spring 90 that restores the lever 89.

The cycle key 42 is operated every time a repeat amount is to be typed upon a check, and it should be understood that the repeat key must be depressed prior to operating the cycle key, otherwise the restoring platform would restore the pins in the regular way. The repeat key, however, may be locked in its depressed position by means of a locking bar 91, which automatically engages a notch 92 in the stem of the depressed repeat key 65, by the action of a spring 93, mounted between two spring studs 94 and 95, respectively fastened to a supporting bracket 96 and to the bar 91.

When it is desired to type a series of checks of a different amount it is necessary to change the type-head 37, and then to depress an eliminator or error key 97, which is effective to restore all the previously set-up pins 24 to normal inoperative positions, and also to release the repeat key 65. The releasing of the repeat key is effected by means of a cam-plate 98, fast to the stem of the error key 97. When the key 97 is depressed the cam 98 forces the locking bar 91 to release the repeat key, thereby permitting the spring 87 to restore the repeat key to its normal position.

The action of the eliminator or error key 97 is as follows: Upon depression of said key an arm 99, which is rockably mounted on the shaft 45, is swung downwardly, and by the action of a connecting link 100 is effective to swing a bell-crank 101. Said bell-crank 101 is pivotally mounted on a stud 102 and is operatively connected, by means of a pin-and-slot arrangement 103, to a rearwardly-extending link 104. In order that the depression of the eliminator key may be more effective, there is provided mechanism for imparting to the platform 66 a sudden impact or hammer blow, instead of an even motion, thereby making the key more effective. When the link 104 is moved to the rear of the machine, it stretches a spring 105, which is mounted between one end of said link 104 and a downwardly-extending arm 106 of a bell-crank 107 fulcrumed on a fixed pivot 108. Said bell-crank 107 carries a roller 109, which engages a trip pawl 110 that locks the bell-crank 107 against the urge of the spring 105. Upon further stretching of the spring 105, a pin 111, which is fast to the link 104, will engage a downwardly-extending arm of said pawl 110, thereby swinging the pawl out of engagement with the roller 109, and permitting the spring 105 to contract. The release of the spring 105 is an impulse effective to swing the bell-crank 107, which is provided with an extension 112 to engage a pin 113 and force the platform 66 upwardly to restore the indexed pins 24. The actual lifting of said platform is accomplished by the spring 105 and not by the key.

In the modified control shown at Figure 2, the repeat key 65 and its locking bar are discarded and the function of this key, to prevent the restoration of the set-up indexed pins during the cycling of the general operator, is transferred to the cycling key 42. To this end, the section 85 of the lever 89, instead of being actuated by the key 65, is permanently secured to the shaft 45, as shown at Figure 8 and designated as 85$^a$. The shaft 45, it will be remembered, is rocked by the depression of the key 42 through the one-way driving connection between the lever 44 and the arm 46 secured to said shaft.

In the form shown at Figure 1, the pawl 48 is spring pressed toward the pin 49 and the pin 49 is held in position through the link 51 being pressed against the shaft 45 by the spring 121. This construction in Figure 2 has been simplified by discarding the spring 121, providing a new pawl 115 that is fast to the shaft 45, and substituting a new link 114 having an open slot at the lower end to form prongs 119 that straddle the shaft 45 to promote a straight up-and-down movement for the link 114.

With these changes, the cycling key 42 may be depressed and immediately released to be restored by its spring 43. The depression of this key causes the lever 44 to rock the shaft 45, to swing the pawl 115 out from under the link-holding pin 116, releasing said link 114 to the tension-spring 118, and causing a special key-lever 58 to be actuated to type and simultaneously bring the foot 120 to bear upon and depress the stud 64 to vibrate the motor-control lever 27. The rocking of the shaft 45 lifts the section 85$^a$ to vibrate the pawl 78 out of the path of the arm 82. On the release of the key 42 by the finger, the spring 50 forces the adjoining edge of the pawl 115 against the descending pin 116 which serves as a stop to prevent the restoration of the shaft 45, the lever 44, and the section 85$^a$ until the lifting of the link 114 by the rotating cam 59 raises the pin 116 to release the pawl to the restoring action of the spring 50; the parts being so timed that the pawl 115 will snap under the pin 116 just prior to the release of the stud 61 by the cam 59, and the section 85$^a$ will release the pawl 78 after said pawl returns under the pin-restoring platform-lifting arm 82.

It will be understood that after the typing of the first check, it is first necessary to operate a non-print key, not shown but which may be arranged similarly to the disclosure in the Patent of R. M. Becker, No. 1,104,468, dated July 21, 1914, which presents a buffer suitable to intercept the type-bar 36 to prevent printing the same amount a second time upon the first check, and then depress the cycle key 42 of Figure 2, or the repeat key 65 and the key 42 of Figure 1, otherwise the operation of the general operator, after throwing the typed amount into the register, would then restore the indexed pins, and defeat the purpose of this invention.

The machine is provided with a clear signal-key 123, which actuates the same mechanism as the present cycle key 42, in which case the type-bar 36 may be provided with the usual *-type-head 37.

In the Underwood machine, a letter-space mechanism is controlled by the type-bars, each type-bar having a heel 124, designed to strike a universal bar, not shown. It may be desirable, though not essential, that the special type-bar 36 be ineffective to letter-space the carriage, and the heel 124 in the special type-bar may be removed, as shown in Figure 1.

It will be understood that the payee's name and the amount in numerals are typed on the first check of a series by the manipulation of the keys; that the typing of a numerals sets up equivalent values in register accumulating pin-bars; that to register this first typed amount and not restore the set-up index-pins by the general operator, the repeat key 65 is first depressed and held depressed during the subsequent depression of the cycling key 42, which operation accumulates the amount typed in the register and leaves the index-pins set up for subsequently accumulating the same amount; that the second check only requires the typing of the payee's name, and the printing of the same amount at the end of a line on the check is accomplished by the single depression of the cycling key 42, the repeat key having been automatically locked in its depressed position by the bar 91 during the accumulating of the amount for the first check; that after typing the last check in a series of similar amounts, the error-key 97 restores the set of pins; and that in changing to a new series of checks requiring that a new amount be printed, a new type-head 37 is secured to the type-bar 36 and the full typing of the first check of the first series is repeated, to set up register-driving pins that register the subsequent printing of the same amount.

Variations may be resorted to within the scope of the invention, and portions of the improvements may be used without others.

Having thus described my invention, I claim:

1. In a machine of the class described, numeral keys and means connected thereto to print and simultaneously index numbers, means for restoring the indexing means, a register into which the indexed numbers may be run, means for preventing the restoration of the set up indexes, a repeat key for controlling said restoring means, and a cycle key and mechanism for indefinitely running the set up number into a register and mechanism controlled by the cycle key for printing the number indexed each time the number is run into the register.

2. A machine for printing and adding the amount on a series of checks, each check being for the same amount as the others, including an amount printing type, a lever and connections to control the operation of said printing type, means operable for indexing an amount which may be the same amount as is printed by the type, a register controlled by the indexing means, a general operator for advancing the register in accordance with the indexing means and restoring the indexing means in a predetermined cycle, and means for preventing the restoration of said indexing means during an indefinite number of cycle operations, whereby the same amount may be run into the register and concomitantly printed at each cycling of the general operator.

3. A combined writing and adding machine having a motor which when started will operate the machine in cycles, said machine comprising numeral keys and means connected thereto to print and simultaneously index the numbers represented by the numeral keys, a register into which the indexed numbers may be run during a cycle of operations of the machine, means for restoring the index means during a normal cycle operation, means including a repeat key for preventing the restoration of the set-up indexed means, a cycle key and connections for controlling said cycles of operation and mechanism controlled by the cycle key for printing the number indexed each time the cycle key is operated and the indexed number run into the register.

4. In a machine of the class described, numeral keys and means connected thereto to print and simultaneously index numbers, a register into which the indexed numbers may be run, index members and means to restore them at the end of a machine cycle, and means for indefinitely maintaining said restoring means ineffective to restore said index members.

EWELL E. FOWLER.